Dec. 23, 1958

G. E. BARNHART 2,865,693

CYLINDER CONSTRUCTION

Original Filed May 18, 1954

INVENTOR.
George E. Barnhart
BY
Mason & Graham
Attorneys

United States Patent Office 2,865,693
Patented Dec. 23, 1958

2,865,693
CYLINDER CONSTRUCTION
George E. Barnhart, Altadena, Calif.

Original application May 18, 1954, Serial No. 430,479, now Patent No. 2,785,026, dated March 12, 1957. Divided and this application February 27, 1956, Serial No. 568,120

11 Claims. (Cl. 309—2)

This invention has to do with cylindrical metal forms and particularly with piston or cylinder assemblies to be used for power elements or accumulators. The application is a division of my co-pending application Serial No. 430,479, filed May 18, 1954, now Patent No. 2,785,026, issued March 12, 1957.

Heretofore it has been customary to shape cylindrical members to size by machining. I find that I can provide a greatly improved product by cold-working metal cylindrical members to certain preferred shapes. The members so formed have greatly increased strength over machined members of the same material and are thus able to withstand much higher internal fluid pressures than has heretofore been possible with machined elements. Also, I am able to obtain extremely smooth, dense surfaces free of porosity and foreign matter. In this connection it is known that many metals, particularly aluminum alloys, pick up abrasive material when honed and this destroys conventional seal rings.

An object of the invention is to provide novel and improved cylindrical members particularly designed to hold fluid pressure which are much stronger than machined members and which have extremely smooth, dense surfaces free of foreign matter.

Another object is to provide novel and improved constructions for joining cylinder heads or end closures and other elements to cylinders.

A further object is to provide a piston and cylinder construction which is easy to assemble and to disassemble.

These and other objects will be apparent from the drawings and the following description. Referring to the drawings.

Figure 1:
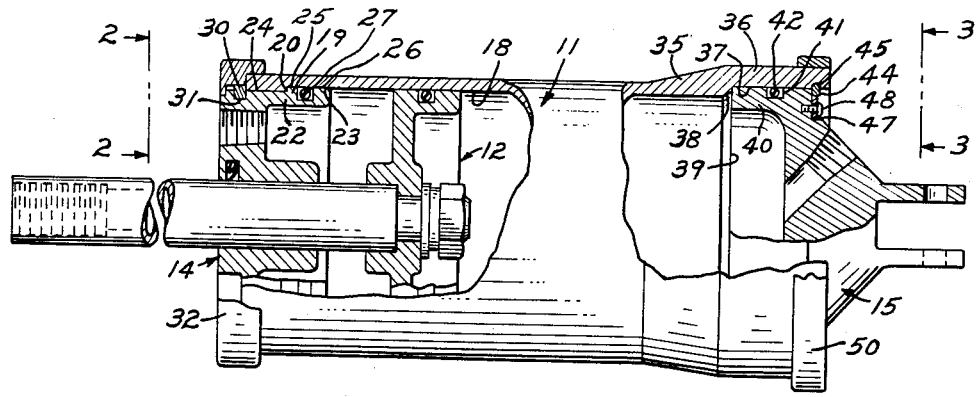
Fig. 1 is a sectional elevational view through a piston and cylinder assembly embodying the invention.
Figure 2:
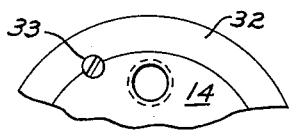
Fig. 2 is a fragmentary and elevational view on line 2—2 of Fig. 1.
Figure 3:
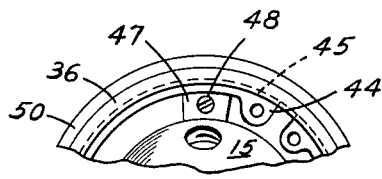
Fig. 3 is a fragmentary and elevational view on line 3—3 of Fig. 1.

More particularly describing the invention, referring first to Figs. 1, 2, and 3, 11 generally indicates a cylindrical member or cylinder, 12 a piston therein, and 14 and 15 cylinder heads or end closures. It is a particular feature of my invention that the cylinder 11 is produced of metal, preferably steel, by cold-forming or cold-working, the metal being drawn, pressure-shaped, or rolled to the shape shown. The inner cylindrical surface 18 of the cylinder is dense, extremely smooth and free of foreign matter, and is thus suitable for holding fluid under high pressure. At one end this surface terminates in an internal shoulder 19 defining the inner limit of an inwardly projecting land 20. The shoulder 19 serves as a means of anchoring and retaining the cylinder end wall head 14 (or other member) the periphery of which is formed to provide a rim 22 having the stepped cylindrical outer surfaces 23 and 24 received in the cylinder as shown and a shoulder 25 which abuts shoulder 19 of the cylinder. Surface 23 of the head is grooved at 26 to receive a sealing ring, such as the O ring 27.

The head 14 is retained by a snap ring 30 in a groove 31 of the head and a guard ring 32 serves to protect this, being held by screws 33.

At its opposite end the cylinder 11 is formed with an outwardly thickened portion 35, the outer surface of which tapers outwardly toward the end of the cylinder. Beyond this is a relatively thick cylindrical end section 36 which has a cylindrical inner surface 37 of greater diameter than surface 18. Between surfaces 18 and 37 are a short tapered surface 38 and a shoulder 39.

The cylinder head 15 has a cylindrical peripheral rim 40 which fits in the end portion 36 of the cylinder. The head 15 is provided with a groove 41 to accommodate a seal ring 42.

The cylinder head 15 is retained by means of a snap ring 44 overlying the outer end of the head and positioned in a groove 45 in the end portion 36 of the cylinder. The snap ring is retained by several circumferentially spaced plates 47 secured by screws 48.

A guard band 50 may be provided at the end of the cylinder.

The construction described provides an extremely strong cylinder eminently suited for withstanding high fluid pressures.

Figure 4:
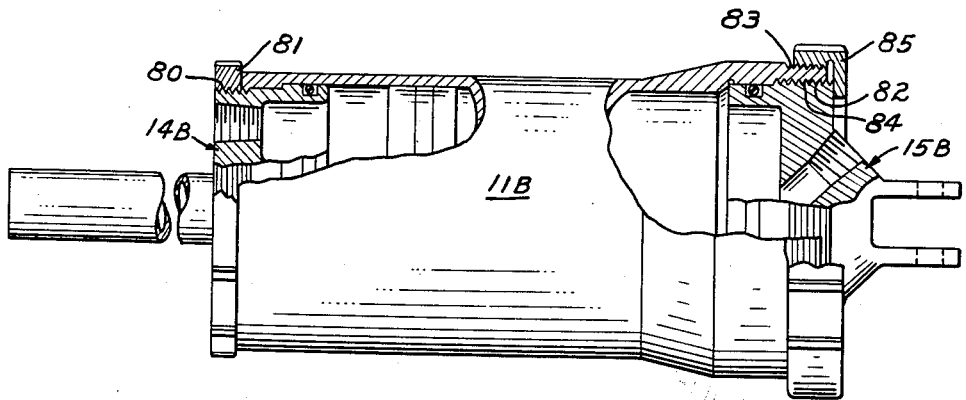
Fig. 4 is a sectional elevational view of an alternate form of cylinder construction.

Referring now to Fig. 4, I show a modified form of construction wherein a cylinder member 11B is provided which is generally similar to the cylinder 11 in wall configuration but which provides a different means of securing the cylinder heads (or other members) therein. In this form of the invention the cylinder head 14B, which is generally similar to cylinder head 14, is provided with a threaded exterior surface 80 to accommodate a threaded retaining ring 81 which screws thereon into abutting relation with the end of the cylinder 11B.

The opposite end of cylinder 11B is threaded interiorly at 82 and exteriorly at 83. At this end of the cylinder a cylinder head 15B is provided which is generally similar to the one 15 but differs therefrom in having an exterior threaded surface 84 whereby the same may be threaded into the end of the cylinder. A guard ring 85 is threaded over the end of the cylinder.

Figure 5:
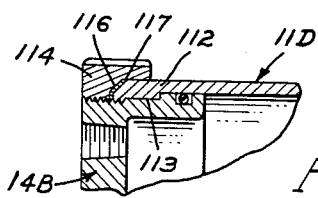
Fig. 5 is a fragmentary sectional detailed view of an alternate cylinder end construction.

Referring to Fig. 5 I show a cylinder 11D which is formed at one end with a thickened section 112 providing a cylindrical surface 113 of lesser diameter than the main portion of the cylinder. The cylinder receives a cylinder head of the type 14B and this is retained by a ring 114 which threads onto the cylinder head. The end of the cylinder is beveled at 116 and the inner surface of the ring correspondingly formed. A gasket 117 of metal or other suitable material, is placed between the parts.

I claim:

1. In a tubular assembly, a cylindrical main member characterized by a cylindrical inner surface extending substantially the length of said member, a radially inwardly projecting shallow first shoulder at one end of said surface, and a radially outwardly projecting second shoulder at the other end of said surface, said member having an end cylindrical inner surface between said second shoulder and the end of said member, a first head member received in said main member in abutment with said first shoulder, means detachably retaining said first head member, a second head member mounted within the end of said main member having said end cylindrical inner surface and against said second shoulder, and means detachably securing said second head member against said second shoulder.

2. A cylinder construction, comprising: a tubular metal member formed to provide a cylindrical body having a main wall section of constant thickness, an outwardly tapered thickened section at one end of said main wall section, and an end section therebeyond having an inner cylindrical surface of greater diameter than the inner diameter of said main wall section, said inner cylindrical surface having an annular groove therein; a cylinder head received in said end section of said member, inwardly of said groove; a split retaining ring mounted in said groove in abutting engagement with an outer surface of said head; and a split ring retaining means detachably secured to said head and engaging the interior surface of said ring.

3. A construction as set forth in claim 2, in which said tubular metal member is formed to provide a radially inwardly extending shoulder at the other end of said main wall section, and in which a closure is mounted within said other end in engagement with and held against outward movement by said shoulder.

4. In means for limiting relative axial movement of a pair of members having interfitting cylindrical portions, one of said members having a circumferential groove in its cylindrical portion, a split ring in said groove projecting radially into the path of the other member, and a ring retainer member secured to one of said members in position to prevent said split ring from flexing sufficiently to escape from said groove.

5. In a cylinder construction, a cylinder providing an internal groove adjacent one end thereof, a cylinder head member received in said cylinder, a split ring received in said groove, and a ring retainer means carried by said head member in position to prevent escape of said split ring from said groove.

6. In a tubular assembly, a cylindrical main member characterized by a cylindrical inner surface extending substantially the length of said member, a radially inwardly projecting shallow first shoulder at one end of said surface, and a radially outwardly projecting second shoulder at the other end of said surface, said member having an end cylindrical inner surface between said second shoulder and the end of said member, a first head member received in said main member in abutment with said first shoulder, means detachably retaining said first head member, a second head member mounted within the end of said main member having said end cylindrical inner surface and against said second shoulder, and means detachably securing said second head member against said second shoulder, said last-mentioned means comprising a groove in said end cylindrical inner surface of said main member, a split ring in said groove partially overlying an outer surface of said second head member, and detachable means carried by one of said second head member and said main member for retaining said split ring.

7. In a tubular assembly, a cylindrical main member characterized by a cylindrical inner surface extending substantially the length of said member, a radially inwardly projecting shallow first shoulder at one end of said surface, and a radially outwardly projecting second shoulder at the other end of said surface, said member having an end cylindrical inner surface between said second shoulder and the end of said member, a first head member received in said main member in abutment with said first shoulder, means detachably retaining said first head member, a second head member mounted within the end of said main member having said end cylindrical inner surface and against said second shoulder, and means detachably securing said second head member against said second shoulder, the means detachably retaining said first head member comprising a groove in said head member, a split ring in said groove partially overlying the adjacent outer end of said main member, a guard ring substantially enclosing said split ring and overlying the end portion of said main member, said guard ring serving to retain said split ring, and detachable means retaining said guard ring.

8. In a tubular assembly, a cylindrical main member characterized by a cylindrical inner surface extending substantially the length of said member, a radially inwardly projecting shallow first shoulder at one end of said surface, and a radially outwardly projecting second shoulder at the other end of said surface, said member having an end cylindrical inner surface between said second shoulder and the end of said member, a first head member received in said main member in abutment with said first shoulder, means detachably retaining said first head member, a second head member mounted within the end of said main member having said end cylindrical inner surface and against said second shoulder, and means detachably securing said second head member against said second shoulder, the means detachably retaining said first head member comprising a threaded portion on said first head member and an internally threaded ring on said threaded portion in abutment with the end of said main member.

9. In a tubular assembly, a cylindrical main member characterized by a cylindrical inner surface extending substantially the length of said member, a radially inwardly projecting shallow first shoulder at one end of said surface, and a radially outwardly projecting second shoulder at the other end of said surface, said member having an end cylindrical inner surface between said second shoulder and the end of said member, a first head member received in said main member in abutment with said first shoulder, means detachably retaining said first head member, a second head member mounted within the end of said main member having said end cylindrical inner surface and against said second shoulder, and means detachably securing said second head member against said second shoulder, the means detachably retaining said first head member comprising a threaded portion on said first head member and an integrally threaded ring on said threaded portion said ring and the end of said main member adjacent thereto being complementarily beveled, and a seal ring between said ring and said main member.

10. In a tubular assembly, a cylindrical main member characterized by a cylindrical inner surface extending substantially the length of said member, a radially inwardly projecting shallow first shoulder at one end of said surface, a radially outwardly projecting second shoulder at the other end of said surface, said member having an end cylindrical inner surface between said second shoulder and the end of said member, a first head member received in said main member in abutment with said first shoulder, means detachably retaining said first head member, a second head member mounted within the end of said main member having said end cylindrical inner surface and against said second shoulder, and means detachably securing said second head member against said second shoulder, said last mentioned means comprising internal and external threaded portions formed on said main member, external threads on said second head member, and an internally threaded guard ring threaded on said main member and overlying a portion of the outer surface of said second head member.

11. In combination, a first member, a second member, said first and second members having interfitting cylindrical portions, one of said members having a circumferential groove in its cylindrical portion, a third member for limiting relative axial movement between said first and second members, said third member comprising a flexible split ring in said groove projecting into the path of the other of said first and second members, and a ring retainer member secured to one of said first, second and third members in position to prevent said third member from flexing sufficiently to escape from said groove.

References Cited in the file of this patent
UNITED STATES PATENTS

| | | |
|---|---|---|
| 2,356,899 | Stutter | Aug. 29, 1944 |
| 2,389,118 | Buehner | Nov. 20, 1945 |
| 2,647,656 | Frisch | Aug. 4, 1953 |